United States Patent
Ogawa et al.

(10) Patent No.: US 9,368,292 B2
(45) Date of Patent: Jun. 14, 2016

(54) CARBON MATERIAL FOR POLARIZABLE ELECTRODES AND METHOD FOR PRODUCING SAME

(71) Applicant: KURARAY CHEMICAL CO., LTD., Bizen-shi (JP)

(72) Inventors: Akimi Ogawa, Bizen (JP); Yumika Ninomiya, Bizen (JP); Shushi Nishimura, Bizen (JP); Kiyoto Otsuka, Bizen (JP)

(73) Assignee: KURARAY CHEMICAL CO., LTD., Bizen-shi (JP)

( * ) Notice: Subject to any disclaimer, the term of this patent is extended or adjusted under 35 U.S.C. 154(b) by 0 days.

(21) Appl. No.: 14/441,735

(22) PCT Filed: Nov. 12, 2013

(86) PCT No.: PCT/JP2013/080494
§ 371 (c)(1),
(2) Date: May 8, 2015

(87) PCT Pub. No.: WO2014/077229
PCT Pub. Date: May 22, 2014

(65) Prior Publication Data
US 2015/0287545 A1    Oct. 8, 2015

(30) Foreign Application Priority Data
Nov. 13, 2012    (JP) ................................ 2012-249758

(51) Int. Cl.
*H01G 11/38*    (2013.01)
*H01G 11/32*    (2013.01)
*H01G 11/86*    (2013.01)
*H01G 11/28*    (2013.01)

(52) U.S. Cl.
CPC .............. *H01G 11/38* (2013.01); *H01G 11/28* (2013.01); *H01G 11/32* (2013.01); *H01G 11/86* (2013.01); *Y02E 60/13* (2013.01)

(58) Field of Classification Search
CPC ....... H01G 11/38; H01G 11/28; H01G 11/32; H01G 11/86
See application file for complete search history.

(56) References Cited

U.S. PATENT DOCUMENTS

2003/0091905 A1    5/2003    Nobuta et al.
2004/0029003 A1    2/2004    Nobuta et al.
(Continued)

FOREIGN PATENT DOCUMENTS

JP    2003 123834    4/2003
JP    2004 127920    4/2004
(Continued)

OTHER PUBLICATIONS

International Search Report issued Jan. 28, 2014 in PCT/JP13/080494 filed Nov. 12, 2013.
(Continued)

*Primary Examiner* — David M Sinclair
(74) *Attorney, Agent, or Firm* — Oblon, McClelland, Maier & Neustadt, L.L.P.

(57) ABSTRACT

There is provided a carbon material for polarizable electrodes in which a heterocyclic aromatic compound is adsorbed on an activated carbon, wherein the heterocyclic aromatic compound comprises a five- or six-membered ring having two or more nitrogen atoms as ring-forming atoms; a ratio (N/C) of nitrogen atoms to carbon atoms in the heterocyclic aromatic compound is 0.4 or more; 1 to 35 parts by mass of the heterocyclic aromatic compound is adsorbed based on 100 parts by mass of the activated carbon; and the carbon material for polarizable electrodes has a benzene adsorption capacity of 25 to 75% by mass.

9 Claims, 3 Drawing Sheets

(56) References Cited

U.S. PATENT DOCUMENTS

| | | | |
|---|---|---|---|
| 2004/0114307 A1 | 6/2004 | Oyama et al. | |
| 2010/0216022 A1 | 8/2010 | Sano et al. | |
| 2013/0023405 A1* | 1/2013 | Hitomi | B01J 21/18 502/180 |
| 2013/0231423 A1* | 9/2013 | Rumpf | C09C 1/48 524/105 |
| 2013/0337315 A1 | 12/2013 | Yamamoto et al. | |

FOREIGN PATENT DOCUMENTS

| | | |
|---|---|---|
| JP | 2004 193569 | 7/2004 |
| JP | 2010 192403 | 9/2010 |
| JP | 2010 205870 | 9/2010 |
| JP | 2010 239085 | 10/2010 |
| JP | 2010 245071 | 10/2010 |
| JP | 2012 109539 | 6/2012 |
| JP | 2012 174350 | 9/2012 |

OTHER PUBLICATIONS

Ishimoto, S. et al., "Degradation Responses of Activated-Carbon-Based EDLCs for Higher Voltage Operation and Their Factors", Journal of the Electrochemical Society, vol. 156, No. 7, pp. A563-A571, 2009.

* cited by examiner

CARBON MATERIAL FOR POLARIZABLE ELECTRODES AND METHOD FOR PRODUCING SAME

TECHNICAL FIELD

The present invention relates to a carbon material for polarizable electrodes in which a heterocyclic aromatic compound is adsorbed on an activated carbon, and a method for producing same. It also relates to a polarizable electrode made of such a carbon material and an electric double layer capacitor therewith.

BACKGROUND ART

An electrochemical capacitor has improved output properties and life properties in comparison with a battery. Based on such properties, storage power sources for backup of various memories, power assist for an automobile, a train or the like, load leveling, rush current and UPS (Uninterruptible Power Supply) and so on have been developed and practically used. Performance requirement to an electrochemical capacitor has been increasingly stricter. In particular, it is desired to develop a highly durable electrochemical capacitor with a large capacitance per a unit electrode volume. Furthermore, in the light of safety, decreased gas generation is also desired.

Here, electrochemical capacitors can be generally categorized into electric double layer capacitors and pseudo-double-layer capacitors, depending on a mechanism of charge accumulation. An electric double layer capacitor stores charge by utilizing positive/negative charge from electric double layers aligned in a solid-liquid interface by applying an electric field. On the other hand, a pseudo-double-layer capacitor stores charge by a redox reaction of an active material on an electrode. An electrochemically active metal oxide or conductive polymer is used as a material for an electrode in a pseudo-double-layer capacitor (redox capacitor, pseudocapacitor) utilizing nonpolarizable pseudocapacitance (redox).

Electrolytic solution used in an electrochemical capacitor can be categorized into aqueous electrolytic solution as aqueous acid solutions and nonaqueous electrolytic solutions composed of an organic solvent as a main solvent. Generally, an aqueous electrolytic solution is characteristic in that it has a lower internal resistance due to its higher electric conductivity than a nonaqueous electrolytic solution and is inexpensive. On the other hand, a nonaqueous electrolytic solution is characterized in that an operating temperature range is wider and corrosivity is lower in comparison with an aqueous electrolytic solution. Furthermore, a nonaqueous electrolytic solution has a higher decomposition voltage than an aqueous electrolytic solution. An energy density of an electric double layer capacitor increases in proportion to the square of a cell voltage (maximum charge voltage). Therefore, a nonaqueous electrolytic solution can be used as an electrolytic solution, to give an electric double layer capacitor with a high energy density. Based on this standpoint, an electric double layer capacitor using a nonaqueous electrolytic solution has been commonly used. In particular, an electric double layer capacitor prepared using a polarizable electrode containing an activated carbon has a capacitance per a unit electrode volume and excellent durability, and is advantageous in terms of cost.

A maximum charge voltage of an electric double layer capacitor using a nonaqueous electrolytic solution is generally 2.5 to 2.7 V. If a larger voltage than the limits is applied, the capacitor is unsuitable for practical use due to reduction in a capacitance and increase in an internal resistance.

Reduction in a capacitance and increase in an internal resistance are caused by deterioration of constituent members (polarizable electrodes, an electrolytic solution, an electrolyte, a current collector and so on) in an electric double layer capacitor due to an electrochemical reaction. Specifically, it is known that in the positive electrode side, surface functional groups present in an activated carbon such as carboxyl and hydroxyl groups are decomposed to generate gases such as carbon dioxide and carbon monoxide. It is also known that a trace amount of water (residual water) contained in an electrolytic solution or activated carbon is decomposed to generate a strong acid, which causes corrosion of a current collector. In the negative electrode side, residual water is reductively decomposed to generate hydroxide ions, which promote decomposition of an electrolytic solution or electrolyte, inducing formation of insoluble polymer substance and generation of gases such as propylene, carbon dioxide, carbon monoxide and ethylene. Then, it is known that these substances occlude pores in a polarizable electrode, causing capacity reduction (Non-patent reference No. 1).

As well known, deterioration of an electric double layer capacitor can be inhibited by heating an activated carbon under an inert gas atmosphere to reduce surface functional groups in an activated carbon such as carboxyl and hydroxyl groups which are to initiate a deterioration reaction. However, even when an activated carbon with a reduced number of surface functional groups is used as a polarizable electrode, deterioration of an electric double layer capacitor cannot be adequately prevented. Furthermore, excessive removal of surface functional groups leads to reduced miscibility of activated carbon powders used for a polarizable electrode with a binder, so that formation of a polarizable electrode becomes difficult, resulting in reduction in productivity. Thus, various methods have been investigated for improving durability of an electric double layer capacitor on the basis of the above-mentioned deterioration mechanism.

Patent Reference No. 1 has described an electric double layer capacitor in which a capacitor element having a polarizable positive electrode, a polarizable negative electrode, and a separator disposed therebetween and containing a nonaqueous electrolytic solution is placed in an exterior case, wherein a solid base is contained in the exterior case. The method described in Patent Reference No. 1 is a method for improving durability by capturing impurity ions which accelerate decomposition of, for example, an electrolytic solution. Specifically, the method is a method for capturing protons generated by decomposition of residual water by a solid base such as amorphous silica-alumina and magnesia placed in a cell. It is described therein that the method prevents acidification of an electrolytic solution, improving durability of an electric double layer capacitor.

Patent Reference No. 2 has described an electrolytic solution additive for an electric double layer capacitor, which is made of an electrolytically polymerizable polymer precursor. According to the method described in Patent Reference No. 2, first, pyrrole, aniline and indole as electrolytically polymerizable polymer precursors are added to a nonaqueous electrolytic solution. Then, initial charge to the electric double layer capacitor initiates electrolytic polymerization of the polymer precursor contained in the electrolytic solution to precipitate a polymer on electrochemically active points present in the electrode in the positive electrode side, so that the active points are covered by the polymer. Thus, electrochemically active points which are believed to cause deterioration of the electrode are inactivated, so that deterioration of the electrode is prevented.

Patent Reference No. 3 has described an electric double layer capacitor comprising an electrolytic solution containing an electrolyte, an organic solvent and a triazole derivative, whereby corrosion of a collective electrode of electrodes, deterioration of an electrode binder and decomposition of an electrolytic solution can be prevented to give an electric double layer capacitor which has excellent high-temperature load properties and thus manifests higher voltage resistance. Patent Reference No. 3 has listed benzotriazole derivatives and triazole derivatives having an amino group as a triazole derivative used for an electrolytic solution.

Patent Reference No. 4 has described an electric double layer capacitor comprising an electrolytic solution containing γ-butyrolactone and one or two or more additives selected from anthraquinone, triazole and benzotriazole. It is therein described that the electric double layer capacitor prevents a reaction of water in the electrolytic solution with a current collector to prevent deterioration of an electrolytic solution and thus can be used at a voltage of 3 V or higher.

However, in an electric double layer capacitor prepared as described in Patent Reference Nos. 1 to 4, there is room for improvement in a capacitance maintenance rate and gas generation and durability is not completely satisfactory.

PRIOR ART REFERENCES

Patent References

Patent Reference No. 1: JP 2010-239085 A
Patent Reference No. 2: JP 2010-205870 A
Patent Reference No. 3: JP 2012-109539 A
Patent Reference No. 4: JP 2010-245071 A Non-Patent References Non-patent reference No. 1: Journal of The Electrochemical Society, 156(7) A563-A571 (2009).

Problems to be Solved by the Invention

To solve the above problems, an objective of the present invention is to provide an electric double layer capacitor without a capacitance per a unit electrode volume being deteriorated, which, even after repeating high-voltage charge and discharge, is highly durable with a less amount of gases being generated; a polarizable electrode used for the electric double layer capacitor; and a carbon material for polarizable electrodes which is suitable for the above-described polarizable electrodes.

Means for Solving Problem

The above problems can be solved by providing a carbon material for polarizable electrodes in which a heterocyclic aromatic compound is adsorbed on an activated carbon, wherein the heterocyclic aromatic compound comprises a five- or six-membered ring having two or more nitrogen atoms as ring-forming atoms; a ratio (N/C) of nitrogen atoms to carbon atoms in the heterocyclic aromatic compound is 0.4 or more; 1 to 35 parts by mass of the heterocyclic aromatic compound is adsorbed based on 100 parts by mass of the activated carbon; and the carbon material for polarizable electrodes has a benzene adsorption capacity of 25 to 75% by mass.

Here, it is preferable that the heterocyclic aromatic compound comprises at least one selected from the group consisting of an imidazole ring, a pyrazole ring, a 1,2,3-triazole ring and a 1,2,4-triazole ring. It is also preferable that the heterocyclic aromatic compound has a molecular weight of 100 or less.

The above problems can be also solved by providing a method for producing the carbon material for polarizable electrodes, comprising adsorbing the heterocyclic aromatic compound to the activated carbon.

Here, it is preferable that the activated carbon is immersed in a liquid containing the heterocyclic aromatic compound and then dried to adsorb the compound to the activated carbon. It is also preferable that a liquid containing the heterocyclic aromatic compound is spread to adsorb the compound to the activated carbon. It is also preferable that the activated carbon is contacted with a vapor of the heterocyclic aromatic compound to adsorb the compound to the activated carbon.

The above problems are also solved by providing a polarizable electrode formed by applying an electrode composition comprising the above carbon material, a binder and a conductive material on a current collector.

The above problems are also solved by providing an electric double layer capacitor, wherein the above polarizable electrodes are disposed to face each other via a separator, and the electrode composition comprises a nonaqueous electrolytic solution.

Effects of the Invention

The present invention provides an electric double layer capacitor without a capacitance per a unit electrode volume being deteriorated, which, even after repeating high-voltage charge and discharge, is highly durable with a less amount of gases being generated. The present invention also provides a polarizable electrode used for the electric double layer capacitor, and a carbon material for polarizable electrodes which is suitable for the above-described polarizable electrodes.

MODES FOR CARRYING OUT THE INVENTION

The present invention relates to a carbon material for polarizable electrodes in which a heterocyclic aromatic compound is adsorbed on an activated carbon. After intense investigation, the inventors have achieved an inventive carbon material for polarizable electrode in which a heterocyclic aromatic compound is adsorbed on an activated carbon and has a five- or six-membered ring having two or more nitrogen atoms as ring-forming atoms and has a ratio of nitrogen atoms to carbon atoms (N/C) of 0.4 or more. The inventors have also found that an electric double layer capacitor produced using a polarizable electrode containing the carbon material has excellent durability without a capacitance per a unit electrode volume being deteriorated.

In the present invention, it is important to use a carbon material for polarizable electrodes in which a heterocyclic aromatic compound is adsorbed on an activated carbon. In general, it is known that in an electric double layer capacitor using a polarizable electrode containing an activated carbon, application of a voltage initiates decomposition of surface functional groups present in the activated carbon such as carboxyl groups and hydroxyl groups to generate gases such as carbon dioxide and carbon monoxide or decomposition of a small amount of water contained in an electrolytic solution or activated carbon to generate hydrogen or hydroxide ions, leading to deterioration in an electric double layer capacitor. To prevent such deterioration, there has been reported a method in which a heterocyclic aromatic compound is added to an electrolytic solution. We, however, have found that without adding a heterocyclic aromatic compound to an electrolytic solution, preliminary adsorption of the compound on an activated carbon can result in more excellent durability in comparison with the case of addition to an electrolytic solution, without a capacitance per a unit electrode volume being deteriorated and with gas generation being inhibited.

In the present invention, it is important that the heterocyclic aromatic compound has a five- or six-membered ring having two or more nitrogen atoms as ring-forming atoms. If a heterocyclic aromatic compound having a five- or six-membered ring in which only one ring-forming atom is a nitrogen atom is used, a gas generation amount considerably increases. In the light of availability of the compound, it is suitable that two or three ring-forming atoms are nitrogen atoms.

In the present invention, it is also important that a ratio (N/C) of nitrogen atoms to carbon atoms contained in a heterocyclic aromatic compound is 0.4 or more. If a ratio (N/C) of nitrogen atoms to carbon atoms is less than 0.4, decomposition of an electrolyte by hydroxide ions generated by decomposition of a small amount of water contained in the electrolytic solution or the activated carbon cannot be prevented, so that excellent durability cannot be achieved. Preferably, a ratio (N/C) of nitrogen atoms to carbon atoms is 0.5 or more.

Preferably, the heterocyclic aromatic compound has at least one ring selected from the group consisting of an imidazole, a pyrazole, a 1,2,3-triazole and a 1,2,4-triazole rings. These rings can have for example, an alkyl, a phenyl, an amino, a hydroxyl, a carboxyl and/or a formyl groups bonded to a ring-forming carbon or nitrogen atom. Furthermore, these rings can form a fused ring.

Preferably, a molecular weight of the heterocyclic aromatic compound is 100 or less. If a molecular weight of the heterocyclic aromatic compound is more than 100, durability may be inadequate. In the light of further improving durability, a molecular weight of the heterocyclic aromatic compound is more preferably 80 or less.

Examples of the heterocyclic aromatic compound include imidazole, pyrazole, 1,2,3-triazole, 1,2,4-triazole, purine and pteridine. Among others, imidazole, pyrazole, 1,2,3-triazole and 1,2,4-triazole are suitable in the light of availability, a cost and thermal stability. These heterocyclic aromatic compounds can be used alone or in combination of two or more.

There will be described an activated carbon used for a carbon material of the present invention. Examples of a raw material for an activated carbon include, but not limited to, plant carbonaceous materials (for example, plant-based materials including wood, shaving, charcoal, fruit shells such as palm shell and walnut shell, fruit seeds, pulp production byproducts, lignin and blackstrap molasses), mineral carbonaceous materials (for example, mineral-based materials including turf, lignite, brown coal, bituminous coal, anthracite, coke, coal tar, coal pitch, petroleum distillation residue and petroleum pitch), synthetic-resin carbonaceous materials (for example, materials derived from a synthetic resin such as a phenol resin, a polyvinylidene chloride and an acrylic resin), and natural-fiber carbonaceous materials (for example, natural fibers such as cellulose, and materials derived from a natural fiber such as a regenerated fiber including rayon). These raw materials can be used alone or in combination of two or more. Among these raw materials, palm shell and a phenol resin are preferable in the light of tendency to generate micropores involving adsorption of an electrolyte.

A method for producing an activated carbon can be any activation method such as a gas activation method and a chemical activation method, or a combination of a gas and a chemical activation methods. Since an activated carbon is used as an electrode material in the present invention, a gas activation method is preferable in the light of reducing the amount of residual impurities.

A gas activation method can be conducted by, for example, reacting a carbonized carbonaceous material with an activation gas (for example, steam and carbon dioxide gas) generally at a temperature of 700 to 1100° C., preferably 800 to 980° C., more preferably 850 to 950° C. In the light of safety and reactivity, a steam-containing gas which contains 10 to 50 mol % of steam is preferable. There are no particular restrictions to an activation time and a temperature-increase rate, but they can be appropriately chosen, depending on a type, a shape and a size of a carbonaceous material used.

A chemical activator used in a chemical activation method can be a substance which is dehydrating, oxidative and corrosive, such as zinc chloride, potassium hydroxide, sodium hydroxide, phosphoric acid, potassium sulfide and sulfuric acid. A concentration and the amount of the chemical activator can be appropriately selected, depending on the type of the chemical activator used and the amount of the raw material.

A metal present in a carbon material precipitates during charging/discharging, causing short circuit or accelerated deterioration in an electric double layer capacitor. It is, therefore, necessary to remove impurities such as a metal in a carbon material as much as possible. A concentration of impurities such as a metal in an activated carbon in the carbon material of the present invention is preferably 1% by mass or less. If a concentration of impurities such as a metal in an activated carbon is more than 1% by mass, deterioration is undesirably accelerated.

Impurities in an activated carbon can be removed by washing the activated carbon with an aqueous acid solution or water. In particular, in the light of washing efficiency, washing with an aqueous acid solution is preferable. After the activated carbon is washed with an aqueous acid solution, it can be washed with water or repeatedly with water. Examples of an aqueous acid solution used include inorganic acids such as hydrochloric acid, nitric acid, sulfuric acid and phosphoric acid; and organic acids such as carboxylic acids and sulfonic acids. An inorganic acid is suitably used, which can remove a metal in an activated carbon with higher efficiency. Among these, hydrochloric acid is more suitably used, which is not oxidative to an activated carbon. A concentration of an aqueous acid solution is preferably 0.05 to 3.0% by mass. if a concentration of an aqueous acid solution is less than 0.05% by mass, an efficiency of impurity removal may be reduced. If it is more than 3.0% by mass, the amount of residual acid in the activated carbon may be increased. A concentration of an aqueous acid solution is more preferably 0.1 to 0.3% by mass.

When a polarizable electrode is produced using a carbon material of the present invention, the carbon material is generally pulverized for use. Depending on a method for producing a polarizable electrode, a central particle size of a carbon material is preferably 1 to 30 μm in the light of an electrode density, an output and a productivity. If a central particle size is less than 1 μm, productivity may be undesirably declined in the pulverizing step. If a central particle size is more than 30 μm, an electrode density and output may be undesirably reduced. A central particle size is more preferably 5 to 10 μm. Here, a central particle size is a particle size where a cumulative percentage of a volume particle-size distribution is 50% (D50), which is determined by, for example, laser diffraction and scattering using a particle size distribution analyzer (Microtrac). Pulverization can be conducted using a known pulverizing machine such as a corn crusher, a double roll crusher, a disk crusher, a rotary crusher, a ball mill, a centrifugal roll mill, a ring roll mill, a centrifugal ball mill and a jet mill. Furthermore, pulverization can be combined with a classifier to control a particle size distribution. For producing a polarizable electrode using a carbon material of the present invention, the carbon material can be pulverized before adsorption of a heterocyclic aromatic compound, or alternatively, a heterocyclic aromatic compound can be adsorbed on a carbon material before pulverization.

In an activated carbon used in a carbon material of the present invention, the amount of surface functional groups as determined by a hydrochloric-acid titration method is preferably 0.1 to 1.5 meq/g, more preferably 0.2 to 1.0 meq/g, in the light of reducing the amount of surface functional groups causing gas generation and endowing a polarizable electrode produced with proper wetting characteristics. If the amount of surface functional groups is less than 0.1 meq/g, miscibility of a carbon material with a binder may be reduced and formability of a polarizable electrode may become difficult, leading to productivity decline. If the amount of surface functional groups is more than 1.5 meq/g, durability of a polarizable electrode may be reduced.

A BET specific surface area of an activated carbon before adsorption of a heterocyclic aromatic compound as determined by a nitrogen adsorption method is preferably 800 to 2300 $m^2/g$, more preferably 1400 to 2200 $m^2/g$. If a BET specific surface area is less than 800 $m^2/g$, an average pore size of an activated carbon becomes relatively smaller. As a result, in an electric double layer capacitor produced using the polarizable electrode, a diffusion resistance of non-aqueous electrolyte ions in the pores of the activated carbon may increase during charge/discharge under a high current. If a BET specific surface area is more than 2300 $m^2/g$, a bulk density of the carbon material obtained may be decreased, leading to reduction in a capacitance per a unit volume.

There are no particular restrictions to a method for producing a carbon material of the present invention as long as the above heterocyclic aromatic compound can be adsorbed on an activated carbon. A heterocyclic aromatic compound may be adsorbed on a carbonaceous material as a raw material for an activated carbon before activation and baking to give a carbon material in which the heterocyclic aromatic compound is adsorbed on the activated carbon. However, since a heterocyclic aromatic compound may be vaporized or thermally decomposed in the course of activation and baking, it is preferable that a carbonaceous material as a raw material for an activated carbon is activated and baked before adsorption of a heterocyclic aromatic compound. A heterocyclic aromatic compound can be adsorbed on an activated carbon by, for example, any of the following first to third processes.

According to a first process, an activated carbon is immersed in a liquid containing the above heterocyclic aromatic compound for adsorption, followed by drying to give a carbon material for polarizable electrodes. Specifically, this process contains preparing an aqueous solution or dispersion of a predetermined amount of a heterocyclic aromatic compound (hereinafter, sometimes simply referred to as a "prepared solution") and then immersing an activated carbon in the prepared solution. Then, the activated carbon is separated from the prepared solution and then dried. A medium for the aqueous solution or dispersion is preferably ion exchanged water or purified water in which metal ions have been removed. A concentration of a heterocyclic aromatic compound in the prepared solution is preferably 0.5 to 5% by mass in the light of efficient adsorption of the heterocyclic aromatic compound on an activated carbon and economic efficiency. If the amount of the prepared solution in immersion of an activated carbon is too small, the heterocyclic aromatic compound may not be evenly adsorbed on the activated carbon. If the amount is too large, a time for separating the activated carbon from the prepared solution may be so long that productivity may be declined. The amount of the prepared solution used for immersion of an activated carbon is preferably 400 to 600 parts by mass based on 100 parts by mass of an activated carbon 100 parts by mass. An immersion time is preferably 1 to 24 hours in the light of even adsorption of a heterocyclic aromatic compound on an activated carbon. Here, the activated carbon is preferably immersed with stirring, in the light of quality stability. A drying temperature is preferably equal to or lower than a temperature at which a heterocyclic aromatic compound to be adsorbed on an activated carbon is vaporized or thermally decomposed. Specifically, a drying temperature is preferably 80 to 150° C. If a drying temperature is lower than 80° C., a drying time may be longer, leading to productivity decline. If a drying temperature is higher than 150° C., a heterocyclic aromatic compound adsorbed on an activated carbon and/or the activated carbon itself may be oxidized or the heterocyclic aromatic compound may be removed from the activated carbon, leading to deteriorated durability of an electric double layer capacitor. A drying temperature is preferably 90 to 120° C. Drying can be conducted in an atmosphere of the air or a combustion gas, or in an atmosphere of an inert gas for inhibiting oxidation. Furthermore, in order to shorten a drying time, drying can be conducted under a reduced pressure.

According to a second process, the heterocyclic aromatic compound is adsorbed on the activated carbon by spreading a liquid containing the compound on the activated carbon. Specifically, a predetermined amount of a prepared solution is spread on an activated carbon followed by drying. A concentration of the heterocyclic aromatic compound in the prepared solution is as described for the first process. If the amount spread on the activated carbon is too small or too large, the problems described for the first process may occur. The amount spread on activated carbon is preferably 20 to 50 parts by mass, more preferably 25 to 30 parts by mass based on 100 parts by mass of the activated carbon. There are no particular restrictions to a droplet size in spreading the prepared solution, and the solution can be spread (sprayed) as a mist. A prepared solution is preferably spread (sprayed) as a mist in the light of even adsorption of the heterocyclic aromatic compound on the activated carbon. For even adsorption of the heterocyclic aromatic compound on the activated carbon, it is preferable that the activated carbon is charged in a rotary type mixer such as a concrete mixer and the prepared solution is slowly sprayed using a sprayer. A spray time is preferably 1 to 60 min, depending the amount of the activated carbon used and the spray amount of the prepared solution. If a spray time is less than 1 min, the heterocyclic aromatic compound may not be evenly adsorbed on the activated carbon. If a spray time is more than 60 min, productivity may be declined. A spray time is more preferably 10 to 30 min. Although the activated carbon can be dried immediately after spraying, the activated carbon is preferably dried after stirring for one minute to 48 hours for even adsorption of the heterocyclic aromatic compound on the activated carbon. A drying temperature is preferably 80 to 150° C. If a drying temperature is lower than 80° C., a dry time may be longer, leading to productivity decline. If a drying temperature is higher than 150° C., a heterocyclic aromatic compound adsorbed on the activated carbon and/or the activated carbon itself may be oxidized or the heterocyclic aromatic compound may be removed from the activated carbon, leading to deteriorated durability of an electric double layer capacitor. A drying temperature is more preferably 90 to 120° C. Drying can be conducted in an atmosphere of the air or a combustion gas, or in an atmosphere of an inert gas for inhibiting oxidation. Furthermore, in order to shorten a drying time, drying can be conducted under a reduced pressure.

A central particle size of an activated carbon used in the first and the second processes is preferably 1 μm to 6 mm. If a central particle size of the activated carbon is less than 1 μm, productivity may be declined. If a central particle size of the activated carbon is more than 6 mm, the heterocyclic aromatic compound may not be introduced into pores in the activated carbon, and the heterocyclic aromatic compound may be detached from the activated carbon in the subsequent pulverization step. A central particle size of the activated carbon is more preferably 5 μm to 2 mm. As described above, when a polarizable electrode is produced using a carbon material, generally the carbon material is pulverized for use. Depending on a process for producing a polarizable electrode, a central particle size of the carbon material is preferably 1 to 30 μm in the light of an electrode density, an output and a productivity. Therefore, in the first and the second processes, the activated carbon can be pulverized to a central particle size of 1 to 30 μm before adsorption of the heterocyclic aromatic compound.

According to the third process, the activated carbon and the heterocyclic aromatic compound are heated while a vapor of the heterocyclic aromatic compound is contacted with the activated carbon under the atmosphere of a gas containing the heterocyclic aromatic compound vapor. Here, the activated carbon and the heterocyclic aromatic compound can be mixed before heating these, or the preheated gaseous heterocyclic aromatic compound can be contacted with the heated activated carbon. Alternatively, the activated carbon and the heterocyclic aromatic compound are put together in a closed space, and after vacuuming, heated to contact a vapor containing the heterocyclic aromatic compound with the activated carbon. The activated carbon used in this process can be particulate or powdery.

In the light of even adsorption of the heterocyclic aromatic compound on the activated carbon, the first and the second processes are preferable. Here, among the heterocyclic aromatic compounds listed above, imidazole, pyrazole, 1,2,3-triazole and 1,2,4-triazole are preferable because of their high solubility in water. As long as water solubility is not adversely affected, a substituent can be attached to a carbon or nitrogen atom as a ring-forming member of these compounds. In the light of less volatility in the drying step after adsorption on the activated carbon, imidazole and 1,2,4-triazole are, inter alia, preferable. Furthermore, in the light of energy saving and water removal, the above third process is preferable because the drying step in the first or the second process can be spared.

In a carbon material of the present invention, it is important that 1 to 35 parts by mass of the heterocyclic aromatic compound is adsorbed based on 100 parts by mass of the activated carbon. If the amount of the heterocyclic aromatic compound adsorbed is less than 1 part by mass based on 100 parts by mass of the activated carbon, gas generation cannot be adequately prevented, leading to unsatisfactory durability. In the light of preventing gas generation, the amount of the heterocyclic aromatic compound adsorbed is preferably 2 parts by mass or more based on 100 parts by mass of the activated carbon. If the amount of the heterocyclic aromatic compound adsorbed is more than 35 parts by mass based on 100 parts by mass of the activated carbon, the heterocyclic aromatic compound occlude pores of the activated carbon, leading to reduction in a capacitance, or a viscosity of the electrolytic solution and a resistance are increased. Furthermore, in the light of economic efficiency, the amount of the heterocyclic aromatic compound adsorbed is preferably 20 parts by mass or less, more preferably 10 parts by mass or less, based on 100 parts by mass of the activated carbon.

It is also important that a benzene adsorption capacity of the carbon material of the present invention is 25 to 75% by mass. If a benzene adsorption capacity of the carbon material is less than 25° A) by mass, a capacitance per a unit electrode volume is reduced. In the light of a capacitance, a benzene adsorption capacity is preferably 35% by mass or more. If a benzene adsorption capacity of the carbon material is more than 75° A) by mass, a product cost is undesirably increased. A benzene adsorption capacity of the carbon material is preferably 70° A, by mass or less, more preferably 60° A) by mass or less.

Furthermore, a BET specific surface area of the carbon material of the present invention is preferably 500 m$^2$/g or more as determined by a nitrogen adsorption method. If a BET specific surface area is less than 500 m$^2$/g, a capacitance per a unit electrode volume may be reduced. A BET specific surface area is more preferably 800 m$^2$/g or more. A BET specific surface area is generally 2300 m$^2$/g or less.

A polarizable electrode of the present invention is a current collector on which an electrode composition containing the above carbon material, a binder and a conductive material is applied. A content of the carbon material is generally 60 to 98.5% by mass, suitably 80 to 96.5% by mass based on the total mass of the electrode composition. Examples of a binder which can be used include polytetrafluoroethylene, polyvinylidene fluoride, styrene-butadiene rubber, carboxymethylcellulose, polyvinyl alcohol and polyacrylic acid. A smaller content of the binder is better, but in the light of strength of a polarizable electrode obtained, it is generally 0.5 to 10% by mass based on the total mass of the electrode composition.

Examples of a conductive material include a conductive carbon black such as acetylene black and ketjen black, natural graphite, artificial graphite, thermally expandable graphite, carbon fiber, ruthenium oxide, titanium nitride, aluminum and nickel. A conductive carbon black such as acetylene black and ketjen black can be, inter alia, suitably used because it is highly conductive even in a small amount. The conductive materials can be used alone or in combination of two or more. Depending on a bulk density of a carbon material used (an activated carbon on which a heterocyclic aromatic compound is adsorbed), a content of the conductive material is generally 1 to 30% by mass, preferably 3 to 10% by mass based on the total mass of the electrode composition because an excessive content leads a ratio of the carbon material in the electrode composition to be decreased.

There are no particular restrictions to a process for producing the above polarizable electrode. It can be generally produced by a process wherein a sheet-shaped electrode composition is prepared and fixed on a current collector by adhesion to give a polarizable electrode, or a process wherein a carbon material, a binder, a conductive material and the like are dispersed in a liquid to prepare a slurry, which is then applied on a current collector.

In the former process, for example, a carbon material, a binder and a conductive material are kneaded and rolled to a desired thickness to give a sheet-shaped electrode composition. Subsequently, the sheet-shaped electrode composition is cut into a desired size, which is then bonded to an etched aluminum foil as a current collector via a conductive adhesive, and then to the product, a lead wire or the like is attached by ultrasonic welding. Next, the product is dried to give a polarizable electrode. In the kneading step, various additives can be, if necessary, added, including a liquid such as an organic compound (for example, an alcohol and N-methylpyrrolidone) and water, and a dispersing agent. Although the system can be heated during the kneading, an excessively high temperature may cause not only deterioration of a heterocyclic aromatic compound and a binder, but also occlusion of pores due to melting of the binder itself. It is, therefore, desirable that the conditions are appropriately set, depending on the type of a binder used. A heating temperature is generally 300° C. or lower.

In the latter process, various additives such as a dispersing agent are, if necessary, added to a liquid such as an organic compound (for example, an alcohol and N-methylpyrrolidone) and water, and the resulting mixture is kneaded with the carbon material, a binder and a conductive material until these are evenly dispersed, to give a slurry. The slurry is applied on, for example, an etched aluminum foil as a current collector via a coater. Then, the product is dried and cut into a desired size, to which a lead wire is, if necessary, attached by ultrasonic welding, to give a polarizable electrode.

A current collector is for electrically connecting an electrode composition with an external circuit. A current collector is made of a highly conductive material, typically a conductive carbon paste and a metal foil. Among others, an aluminum foil is commonly used in the light of conductivity, a material cost and processability. A size and a thickness of a current collector are determined, depending on an application of the electric double layer capacitor. A thickness of a current collector is generally 20 to 50 μm. A metal foil used for such a current collector is formed by, for example, rolling processing, so that an oxide film, fine powders formed during processing and a residue such as a residual rolling oil may lead to reduced adhesiveness and increase in a contact resistance in an interface of these. It is, therefore, preferable to use a current collector which has been surface-treated by degreasing, chemical etching or the like.

A suitable embodiment of the present invention is an electric double layer capacitor, wherein the polarizable electrodes described above are disposed to face each other via a separator, and the electrode composition contains a nonaqueous electrolytic solution.

A separator is for preventing short circuit due to contacting between the polarizable electrodes. There are no particular restrictions to a material for a separator as long as it is an insulative material, but it is generally made of a polymer material such as cellulose and polyethylene and inorganic materials such as glass fiber. A separator is preferably a paper, a woven fabric, an unwoven fabric, a porous film or the like in the light of insulation, liquid permeability (ion mobility), ensuring retention of an electrolytic solution and blocking of fine particle permeation. A size and a thickness of a separator are also determined, depending on an application of an electric double layer capacitor. A thickness of a separator is generally 20 to 100 μm.

Examples of a solvent for a nonaqueous electrolytic solution include, but not limited to, carbonates such as propylene carbonate, ethylene carbonate, butylene carbonate, dimethyl carbonate, methylethyl carbonate and diethyl carbonate; lactones such as (γ-butyrolactone, α-methyl-γ-butyllactone, β-methyl-γ-butyllactone), γ-valerolactone and 3-methyl-γ-valerolactone; nitriles such as acetonitrile and propionitrile; sulfoxides such as dimethyl sulfoxide and diethyl sulfoxide; amides such as dimethylformamide and diethylformamide; ethers such as tetrahydrofuran and dimethoxyethane; dimethyl sulfolane and sulfolane. These solvents can be used alone or in combination of two or more. When a solvent having high-melting point such as ethylene carbonate is used, it is preferably combined with a solvent having low-melting point such as propylene carbonate in the light of the use of an electric double layer capacitor at a low temperature.

There are no particular restrictions to an electrolyte to be solved in a solvent, but it is preferably dissolved in a solvent in a high concentration in the light of obtaining sufficient capacitance. Examples of a cationic species in an electrolyte include quaternary ammonium ions such as tetraethylammonium ions, trimethylethylammonium ions, diethylmethyl(2-methoxyethyl)ammonium ions; spiro type quaternary ammonium ions such as spiro-(1,1')-bipyrrolidinium ions; imidazolium ions such as 1-ethyl-3-methylimidazolium ions; and lithium ions. Examples of an anionic species include tetrafluoroborate ions, hexafluorophosphate ions, perchlorate ions and bistrifluoromethane sulfonimide ions. An electrolyte is a salt as a combination of these. An ionic solution such as 1-ethyl-3-methylimidazolium tetrafluoroborate and diethylmethyl(2-methoxyethyl)ammonium tetrafluoroborate can be used as it is, as a nonaqueous electrolytic solution.

In a nonaqueous electrolytic solution, a lower water content is more preferable considering decomposition at a high voltage, and is preferably 200 ppm or less, more preferably 50 ppm or less.

There are no particular restrictions to a process for producing an electric double layer capacitor. For example, a polarizable electrode in which an electrode composition is formed on at least one side of a current collector is prepared. Then, the polarizable electrodes and separators are alternately aligned to prepare a capacitor element. Then, the capacitor element and a nonaqueous electrolytic solution are placed in an exterior case.

An electric double layer capacitor produced using polarizable electrodes containing a carbon material of the present invention has a large capacitance per a unit electrode volume and excellent durability with a less amount of gases being generated. Although a mechanism of such effects is not clearly understood, we suppose as follows. Here it will be described with reference to a case where imidazole is used as a heterocyclic aromatic compound. A small amount of water contained in an electrolytic solution or activated carbon is electrochemically decomposed to generate protons, which are captured by a reaction with a heterocyclic compound having an imine type nitrogen (—N═) such as imidazole as a base. Then, imidazolium ions having a positive charge react with hydroxide ions generated by decomposition of water. We suppose that protons and hydroxide ions which accelerate decomposition of an electrolytic solution are thus captured, so that deterioration of constituent members in an electric double layer capacitor (an electrode composition, an electrolytic solution, an electrolyte, a current collector and the like) and gas generation are inhibited, resulting in improved durability. The effects are prominent when a heterocyclic aromatic compound containing a five- or six-membered ring having two or more nitrogen atoms as ring-forming atoms with an N/C of 0.4 or more is used as in the present invention. Furthermore, in a carbon material of the present invention, such a heterocyclic aromatic compound is preliminarily adsorbed on an activated carbon, and protons generated on the surface of the carbon material can be, therefore, effectively captured.

Furthermore, an electric double layer capacitor of the present invention is highly durable, and is, therefore, useful as a power device for various appliances, automobiles, industrial instruments and so on.

EXAMPLES

There will be further specifically described the present invention with reference to Examples. A particle size, the amount of surface functional groups and a BET specific surface area of the activated carbons used in Examples and Comparative Examples were determined as described below. A BET specific surface area and a benzene adsorption capacity of the carbon materials obtained were also determined as described below.

[Particle Size of Powdery Activated Carbon]

A particle size of the powdery activated carbon used in Examples and Comparative Examples was determined by laser diffractometry. Specifically, a powdery activated carbon to be measured and a surfactant were put into ion exchanged water, and the mixture was ultrasonically vibrated to prepare a homogeneous dispersion, for which a particle size was measured by a permeation method using Microtrac MT3200 from Microtrack Inc., USA. An activated carbon concentration in the homogeneous dispersion was adjusted to be within a measurable concentration range indicated in the apparatus. A surfactant used for homogeneous dispersion was "Triton-X 100" from Kao Corporation. The surfactant was added in such an amount that homogeneous dispersion is allowed without generating foams adversely affecting measurement. In the following Examples, particle sizes D10, D50 and D90 of the powdery activated carbon indicate particle sizes at a volume fraction of 10%, 50% and 90% in a volumetric integrated particle size distribution, respectively.

[Particle Size of Particulate Activated Carbon]

A particle size of the particulate activated carbons used in Examples and Comparative Examples was defined as a sieve opening appropriately set, using a metal wire sieve and a sieve shaker.

[Determination of the Amount of Surface Functional Groups]

The amount of surface functional groups was determined by a well-known hydrochloric-acid titration method (H. P. Boem, Advan. Catal., 1966, 16, 179). Specifically, using sodium ethoxide from Kojundo Chemical Laboratory Co., Ltd., a 0.1 N ethanol solution was prepared as a measurement solution. 0.5 g of a powdery or particulate activated carbon was added to 25 mL of this measurement solution, and the mixture was stirred at 25° C. for 24 hours. Then, the measurement solution was separated from the activated carbon. Then, 10 mL of the measurement solution was taken and neutralization-titrated with 0.1 N hydrochloric acid for calculating the amount of surface functional groups.

[Determination of a BET Specific Surface Area]

Using BELSORP-mini from Bel Japan Inc., an activated carbon or carbon material was heated under a nitrogen stream (nitrogen flow rate: 50 mL/min) at 120° C. for three hours, and a nitrogen adsorption isotherm of the activated carbon and the carbon material at 77 K was determined. Using the obtained adsorption isotherm, analysis was conducted by a multipoint method in accordance with a BET equation, and a specific surface area was calculated from a straight line within the range of a relative pressure $p/p_0$=0.01 to 0.1 in the obtained curve.

[Determination of a Benzene Adsorption Capacity]

In accordance with JIS K1474, a dry air containing benzene was passed through the carbon material and the mass of benzene adsorbed on the carbon material was measured to determine a benzene adsorption capacity (% by mass) from the following equation. Here, measurement was conducted using the air containing benzene in a 1/10 saturation concentration.

Benzene adsorption capacity (% by mass)=[{(a sample mass after benzene adsorption)−(a sample mass before benzene adsorption)}/(a sample mass before benzene adsorption)]×100 (1)

Example 1

In 600 parts by mass of ion exchanged water was dissolved 1.0 parts by mass of imidazole (Wako Pure Chemical Industries, Ltd., Guaranteed Reagent) to prepare an aqueous imidazole solution. In this aqueous solution was immersed 100 parts by mass of coconut shell powder activated carbon from Kuraray Chemical Co., Ltd. vacuum dried at 120° C. for 16 hours (the amount of surface functional groups: 0.38 meq/g, a BET specific surface area: 1668 m$^2$/g, D50: 6 μm (D10: 3 μm, D90: 10 μm), and the mixture was stirred at 25° C. for 12 hours. Then, the activated carbon was separated from the aqueous solution by filtration, and the resulting carbon material was dried at 120° C. for 16 hours, to give 101.0 parts by mass of a carbon material. As seen from Table 1, a BET specific surface area of the resulting carbon material was 1584 m$^2$/g and a benzene adsorption capacity was 46% by mass.

Figure 1:
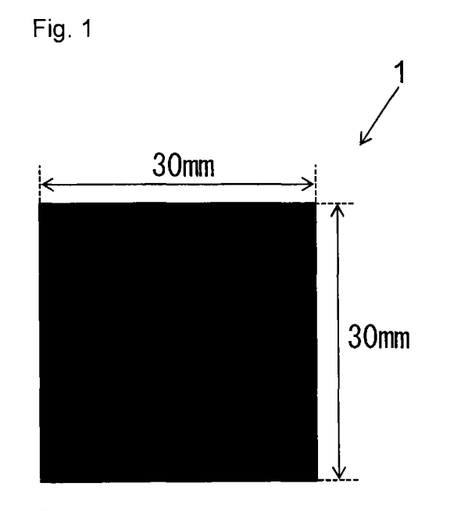
FIG. 1 shows a sheet-shaped electrode composition.
Figure 2:
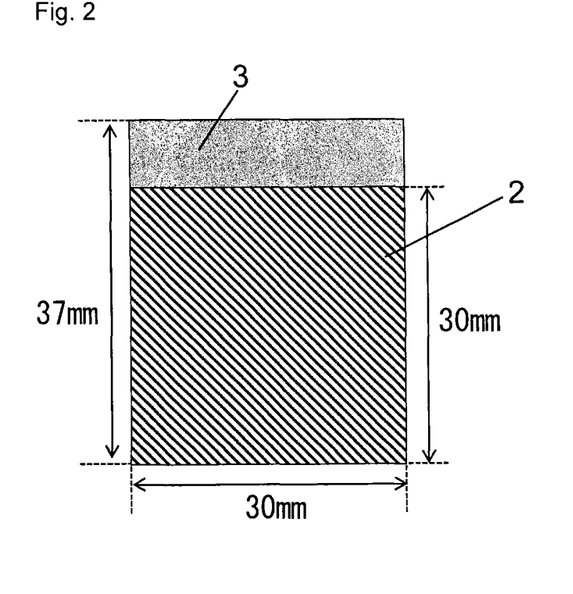
FIG. 2 shows a current collector on which an electrically-conducting adhesive is applied.
Figure 3:
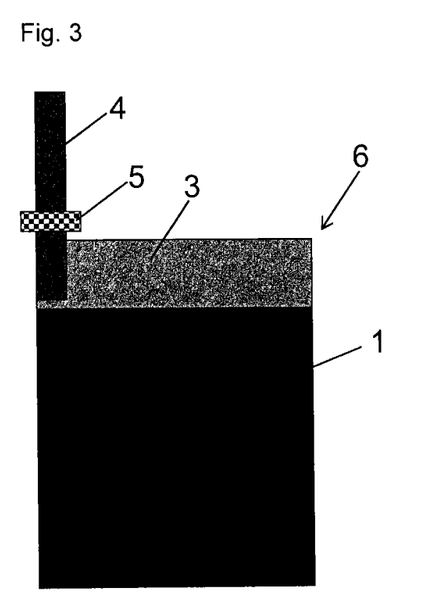
FIG. 3 shows a polarizable electrode formed by binding a sheet-shaped electrode composition to a current collector followed by ultrasonic welding of an aluminum tab.

The obtained carbon material, a binder and a conductive material were kneaded in a mass ratio of 81:9:10. The above binder was polytetrafluoroethylene "6J" from DuPont-Mitsui Co., Ltd., and the above conductive material was a conductive carbon black "DENKA BLACK granule" from Denki Kagaku Kogyo Kabushiki Kaisha. This kneaded mixture was rolled to prepare a sheet-shaped electrode composition 1. The resulting sheet-shaped electrode composition was cut as shown in FIG. 1. Then, the resulting electrode composition 1 was dried at 120° C. for 16 hours or more, and then its weight, sheet thickness and dimensions were measured to determine a volume of the electrode composition 1. Then, as shown in FIG. 2, an electrically-conducting adhesive 2 "HITASOL GA-703" from Hitachi Chemical Co., Ltd. was applied to an etching aluminum foil 3 from Hohsen Corp. so that the adhesive thickness was 100 μm. Then, as shown in FIG. 3, the etching aluminum foil 3 on which the electrically-conducting adhesive 2 was applied, and the sheet-shaped electrode composition 1 which had been previously cut were stuck. Then, using an ultrasonic welder, an aluminum tab 4 with a sealant 5 from Hohsen Corp. was welded to the etching aluminum foil 3. After the welding, the product was vacuum dried at 120° C., to obtain a polarizable electrode 6 equipped with an aluminum current collector.

Figure 4:
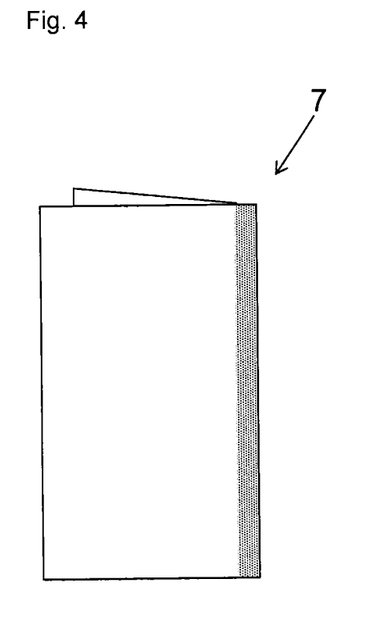
FIG. 4 shows a saclike wrapping sheet.

As shown in FIG. 4, an aluminum laminate resin sheet from Hohsen Corp. was cut into a rectangle (length: 200 mm×width: 60 mm), which was fold in two to, after thermal compressing one side, prepare a saclike wrapping sheet 7 with the remaining two sides being open. Two of the above polarizable electrodes 6 were stacked via a cellulose separator "TF-40" from Nippon Kodoshi Corporation (unshown) to prepare a laminate. This laminate was inserted into the wrapping sheet 7, and the side in contact with a tab 4 was thermally compressed to fix the polarizable electrode 6. Then, after vacuum-drying at 120° C. for 16 hours or more, an electrolytic solution was injected in a glove box. The electrolytic solution was a 1.4 mol/L solution of triethylmethylammonium tetrafluoroborate in propylene carbonate "LIPASTE-P/ TEMAF14N" from Tomiyama Pure Chemical Industries Ltd. In the wrapping sheet 7, the laminate was impregnated with the electrolytic solution and then, the remaining side in the wrapping sheet 7 was thermally compressed to prepare an electric double layer capacitor 8 shown in FIG. 5.

Figure 5:
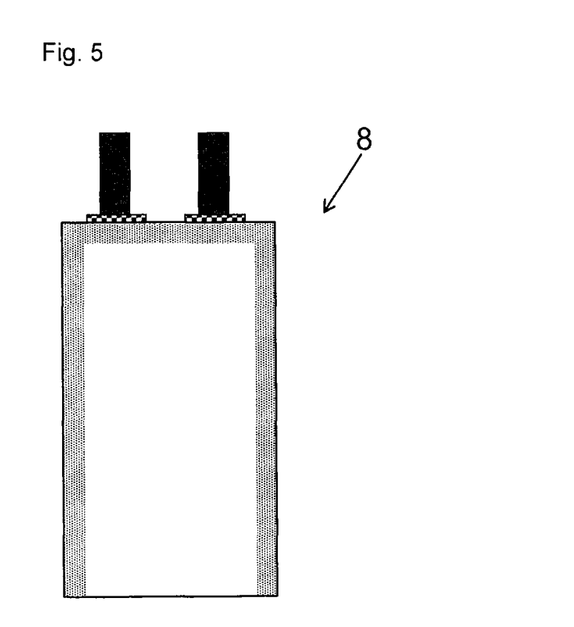
FIG. 5 shows an electric double layer capacitor.

Using a charge/discharge testing machine for an electric double layer capacitor from Power Systems Co., Ltd., the electric double layer capacitor 8 thus obtained was charged at a constant current of 25 mA/9 cm$^2$ per an electrode surface area at 25° C. to an attained voltage of 3.0 V, auxiliary-charged at a constant voltage of 3.0 V for 2 hours, and after completion of the auxiliary charge, discharged at 25 mA/9 cm$^2$. The discharge curve data obtained was converted by an energy conversion method to give a capacitance (F). Here, the energy conversion method is a method for determining a capacitance (F) from a discharge energy in a particular zone during discharge operation. Specifically, a capacitor was charged and then discharged to 0 volt, and from a discharge energy during the process, a capacitance (F) was calculated.

Then, the capacitor was kept in a thermostat bath at 60° C. for 100 hours while a voltage of 3.0 V was applied, and a gas generation amount was measured. Hereinafter, "before the endurance test" is defined as before a capacitor is kept in a thermostat bath at 60° C. for 100 hours while a voltage of 3.0 V is applied, and "after the endurance test" is defined as after keeping for 100 hours under the conditions.

A gas generation amount was determined by determining a cell volume (cc) from a difference between a cell weight in the air (g) and a cell weight in water (g) and calculating a change in a cell volume (cc) between before and after the endurance test. Specifically, a gas generation amount (cc) was determined by the following equation (2).

A gas generation amount (cc)={(a cell weight in the air after the endurance test (g)–a cell weight in water after the endurance test (g))–(a cell weight in the air before the endurance test (g)–a cell weight in water before the endurance test (g))}/{(273+measurement temperature after the endurance test (° C.))/(273+measurement temperature before the endurance test (° C.))} (2)

This was divided by a mass of the activated carbon constituting an electrode composition (g) to give a gas generation amount per a unit mass of the activated carbon (cc/g). A capacitance maintenance rate (%) was calculated by the following equation (3).

A capacitance maintenance rate (%)=(a capacitance after the endurance test (F)/a capacitance before the endurance test (F))×100 (3)

The results are shown in Table 1.

Examples 2 to 5

A carbon materials was produced as described in Example 1, except that the amount of imidazole dissolved in ion exchanged water was changed to 2.0 parts by mass (Example 2), 5.0 parts by mass (Example 3), 10.0 parts by mass (Example 4) or 30.0 parts by mass (Example 5), respectively. In Examples 2 to 5, a mass of the carbon material after filtration and drying was 102.0 parts by mass (Example 2), 105.0 parts by mass (Example 3), 110.0 parts by mass (Example 4) or 130.0 parts by mass (Example 5), respectively. Furthermore, as shown in Table 1, a BET specific surface area of the carbon material obtained was 1543 m$^2$/g (Example 2), 1473 m$^2$/g (Example 3), 1221 m$^2$/g (Example 4), or 791 m$^2$/g (Example 5), respectively. Furthermore, a benzene adsorption capacity of the carbon material obtained was 45% by mass (Example 2), 43% by mass (Example 3), 39% by mass (Example 4), or 27% by mass (Example 5), respectively.

Figure 6:
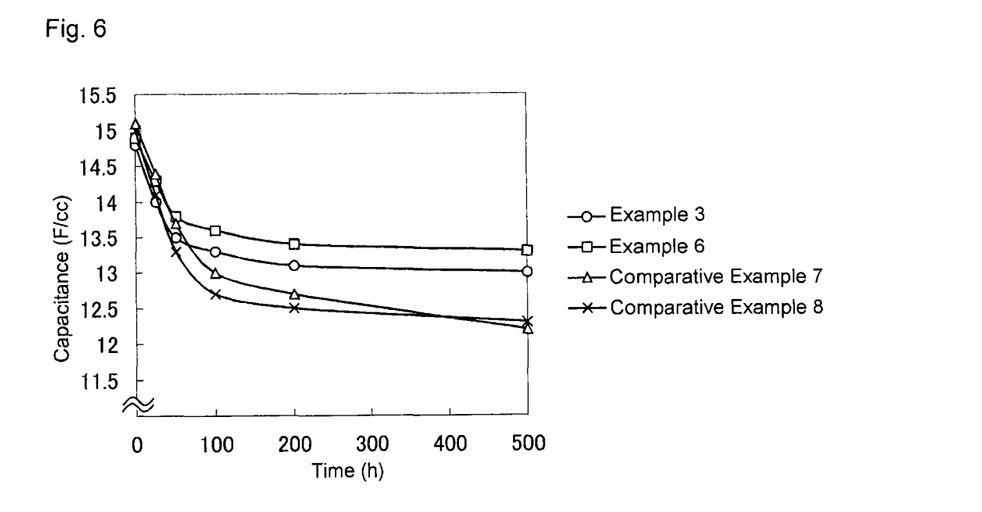
FIG. 6 is a graph illustrating change over time in a capacitance of electric double layer capacitors produced in Examples 3 and 6 and Comparative Examples 7 and 8.

A polarizable electrode 6 and an electric double layer capacitor 8 were produced as described in Example 1, except that the carbon material thus obtained was used. Then, as described in Example 1, a capacitance, a capacitance maintenance rate and a gas generation amount were determined. The measurement conditions and the measurement results are shown in Table 1. For Example 3, a capacitance after keeping in a thermostat bath at 60° C. while a voltage of 3.0 V was applied for 25 hours, 50 hours, 200 hours or 500 hours was also determined. The measurement results are shown in Table 2. FIG. 6 is a graph of a capacitance (F/cc) (vertical axis) vs time (h) (horizontal axis) for the values described in Table 2. Here, we suppose that 500 hours in this measurement corresponds to about 2 years at room temperature.

Example 6

A carbon material was prepared as described in Example 1, substituting 5.0 parts by mass of 1,2,4-triazole (Wako Pure Chemical Industries, Ltd., Guaranteed Reagent) for imidazole. A mass of the carbon material after filtration and drying was 105.0 parts by mass. Furthermore, as shown in Table 1, a BET specific surface area of the carbon material obtained was 1484 m$^2$/g, and a benzene adsorption capacity was 44% by mass. Using the carbon material thus obtained, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 1. Capacitance after keeping in a thermostat bath at 60° C. while a voltage of 3.0 V was applied for 25 hours, 50 hours, 200 hours or 500 hours was also determined. The measurement results are shown in Table 2. FIG. 6 is a graph of a capacitance (F/cc) (vertical axis) vs time (h) (horizontal axis) for the values described in Table 2.

Example 7

A carbon material was prepared as described in Example 1, substituting 5.0 parts by mass of pyrazole (Wako Pure Chemical Industries, Ltd., Guaranteed Reagent) for imidazole. A mass of the carbon material after filtration and drying was 105.0 parts by mass. Furthermore, as shown in Table 1, a BET specific surface area of the carbon material obtained was 1558 m$^2$/g, and a benzene adsorption capacity was 47% by mass. Using the carbon material thus obtained, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 1.

Example 8

A carbon material was prepared as described in Example 1, substituting 5.0 parts by mass of 2-methylimidazole (Wako Pure Chemical Industries, Ltd., Guaranteed Reagent) for imidazole. A mass of the carbon material after filtration and drying was 105.0 parts by mass. Furthermore, as shown in Table 1, a BET specific surface area of the carbon material obtained was 1462 m²/g, and a benzene adsorption capacity was 44% by mass. Using the carbon material thus obtained, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 1.

Example 9

Imidazole (5.0 parts by mass, Wako Pure Chemical Industries, Ltd., Guaranteed Reagent) was mixed with 100 parts by mass of the coconut shell powder activated carbon from Kuraray Chemical Co., Ltd. used in Example 1 and then the mixture was heated under a nitrogen atmosphere at 250° C. for one hour. A mass of the carbon material after heating was 105.0 parts by mass. Furthermore, as shown in Table 1, a BET specific surface area of the carbon material obtained was 1527 m²/g, and a benzene adsorption capacity was 44% by mass. Using this carbon material, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 1.

Example 10

A carbon material was prepared as described in Example 9, substituting 1,2,4-triazole (Wako Pure Chemical Industries, Ltd., Guaranteed Reagent) for imidazole. A mass of the carbon material after heating was 105.0 parts by mass. Furthermore, as shown in Table 1, a BET specific surface area of the carbon material obtained was 1502 m²/g, and a benzene adsorption capacity was 45% by mass. Using this carbon material, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 1.

Example 11

Imidazole (5.0 parts by mass, Wako Pure Chemical Industries, Ltd., Guaranteed Reagent) was dissolved in 25 parts by mass of ion exchanged water to prepare an aqueous solution of imidazole. To 100 parts by mass of coconut shell particulate activated carbon from Kuraray Chemical Co., Ltd. (surface functional group: 0.31 meq/g, BET specific surface area: 1650 m²/g, particle size: 98% by weight or more of the activated carbon pass through a 10 mesh sieve but do not pass through a 60 mesh sieve, residue on ignition: 0.17%) rotating in a concrete mixer was slowly sprayed the above aqueous solution of imidazole over about 10 min. After roll mixing for about one hour, the mixture was dried using a dryer at 120° C. for 16 hours to give 105.0 parts by mass of a carbon material. Furthermore, as shown in Table 1, a BET specific surface area of the carbon material obtained was 1421 m²/g, and a benzene adsorption capacity was 45% by mass. After this carbon material was pulverized to such an extent that a central particle size was 6 μm, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 1.

Example 12

Imidazole (5.0 parts by mass, Wako Pure Chemical Industries, Ltd., Guaranteed Reagent) was mixed with 100 parts by mass of the coconut shell particulate activated carbon from Kuraray Chemical Co., Ltd. used in Example 11, and then the mixture was heated under a nitrogen atmosphere at 250° C. for one hour. A mass of the carbon material after heating was 105.0 parts by mass. Furthermore, as shown in Table 1, a BET specific surface area of the carbon material obtained was 1504 m²/g, and a benzene adsorption capacity was 43% by mass. After this carbon material was pulverized to such an extent that a central particle size was 6 μm, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 1.

Example 13

A carbon material was prepared as described in Example 12, substituting 1,2,4-triazole (Wako Pure Chemical Industries, Ltd., Guaranteed Reagent) for imidazole. A mass of the carbon material after heating was 105.0 parts by mass. Furthermore, as shown in Table 1, a BET specific surface area of the carbon material obtained was 1535 m²/g, and a benzene adsorption capacity was 44% by mass. After this carbon material was pulverized to such an extent that a central particle size was 6 μm, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 1.

Example 14

A carbon material and a polarizable electrode 6 were prepared as described in Example 1, except that the amount of imidazole dissolved in ion exchanged water was 5.0 parts by mass. As shown in Table 1, a BET specific surface area of the carbon material obtained was 1473 m²/g, and a benzene adsorption capacity was 43% by mass. Then, an electric double capacitor 8 was produced as described in Example 1 except that an electrolytic solution was a 1.0 mol/L solution of tetraethylammonium tetrafluoroborate in acetonitrile "LIPASTE-AN/EAF1" from Tomiyama Pure Chemical Industries Ltd. Then, as described in Example 1, a capacitance, a capacitance maintenance rate and a gas generation amount were determined. The measurement conditions and the measurement results are shown in Table 1.

Example 15

A carbon material, a polarizable electrode 6 and an electric double layer capacitor 8 were prepared as described in Example 14, substituting 1,2,4-triazole (Wako Pure Chemical Industries, Ltd., Guaranteed Reagent) for imidazole. As shown in Table 1, a BET specific surface area of the carbon material obtained was 1484 m²/g, and a benzene adsorption capacity was 44% by mass. Then, a capacitance, a capacitance maintenance rate and a gas generation amount were measured as described in Example 1. The measurement conditions and the measurement results are shown in Table 1.

Example 16

A carbon material and a polarizable electrode 6 were prepared as described in Example 12. As shown in Table 1, a BET specific surface area of the carbon material obtained was 1504 $m^2/g$, and a benzene adsorption capacity was 43% by mass. Then, an electric double capacitor 8 was produced as described in Example 1, except that an electrolytic solution was a 1.0 mol/L solution of tetraethylammonium tetrafluoroborate in acetonitrile "LIPASTE-AN/EAF1" from Tomiyama Pure Chemical Industries Ltd. Then, as described in Example 1, a capacitance, a capacitance maintenance rate and a gas generation amount were determined. The measurement conditions and the measurement results are shown in Table 1.

Example 17

A carbon material, a polarizable electrode 6 and an electric double layer capacitor 8 were prepared as described in Example 16, substituting 1,2,4-triazole (Wako Pure Chemical Industries, Ltd., Guaranteed Reagent) for imidazole. As shown in Table 1, a BET specific surface area of the carbon material obtained was 1535 $m^2/g$, and a benzene adsorption capacity was 44% by mass. Then, a capacitance, a capacitance maintenance rate and a gas generation amount were measured as described in Example 1. The measurement conditions and the measurement results are shown in Table 1.

Examples 18 and 19

A carbon material was prepared as described in Example 1, except that a starting activated carbon was coconut shell powder activated carbon from Kuraray Chemical Co., Ltd. (the amount of surface functional groups: 0.46 meq/g, a BET specific surface area: 2283 $m^2/g$, a central particle size D50: 6 μm (D10: 4 μm, D90: 9 μm)) and the amount of imidazole dissolved in ion exchanged water was 5.0 parts by mass (Example 18) or 10.0 parts by mass (Example 19). In Examples 18 and 19, a mass of the carbon material after filtration and drying was 105.0 parts by mass (Example 18) and 110.0 parts by mass (Example 19), respectively. Furthermore, as shown in Table 1, a BET specific surface area of the carbon material obtained was 2012 $m^2/g$ (Example 18) and 1755 $m^2/g$ (Example 19), respectively. A benzene adsorption capacity of the carbon material obtained was 68% by mass (Example 18) and 59% by mass (Example 19), respectively. Using the carbon material thus obtained, as described in Example 1, a polarizable electrode 6 and an electric double layer capacitor 8 were prepared, and a capacitance, a capacitance maintenance rate and a gas generation amount were determined. The measurement conditions and the measurement results are shown in Table 1.

Examples 20 and 21

A carbon material was prepared as described in Example 1, except that a starting activated carbon was an alkali activated carbon (the amount of surface functional groups: 1.37 meq/g, a BET specific surface area: 2170 $m^2/g$, a central particle size D50: 10 μm, (D10: 5 μm, D90: 18 μm)) and the amount of imidazole dissolved in ion exchanged water was 5.0 parts by mass (Example 20) or 10.0 parts by mass (Example 21). The above alkali activated carbon was obtained by pulverizing an anisotropic coke (H/C=0.4) obtained by heating of coal heavy oil by a ball mill to a central particle size of 10 μm, alkali-activating it with KOH, washing it with 0.5 N hydrochloric acid at 90° C. and then desalting it with ion exchanged water. In Examples 20 and 21, a mass of the carbon material after filtration and drying was 105.0 parts by mass (Example 20) and 110.0 parts by mass (Example 21) respectively. Furthermore, as shown in Table 1, a BET specific surface area of the carbon material obtained was 1943 $m^2/g$ (Example 20) and 1727 $m^2/g$ (Example 21), respectively. A benzene adsorption capacity of the carbon material obtained was 65% by mass (Example 20) and 56% by mass (Example 21), respectively. Using the carbon material thus obtained, a polarizable electrode 6 and an electric double layer capacitor 8 were produced as described in Example 1. Then, a capacitance, a capacitance maintenance rate and a gas generation amount were determined as described in Example 1, except that in determination of a capacitance, an attained voltage was 2.8 V. The measurement conditions and the measurement results are shown in Table 1.

Comparative Example 1

A polarizable electrode 6 and an electric double layer capacitor 8 were produced as described in Example 1, using a coconut shell powder activated carbon from Kuraray Chemical Co., Ltd. used in Example 1 as a carbon material, instead of a carbon material in which imidazole was adsorbed on an activated carbon. Then, a capacitance, a capacitance maintenance rate and a gas generation amount were measured as described in Example 1. The measurement conditions and the measurement results are shown in Table 3.

Comparative Example 2

A carbon material was prepared as described in Example 1, except that the amount of imidazole dissolved in ion exchanged water was 50.0 parts by mass. A mass of the carbon material after filtration and drying was 150.0 parts by mass. As shown in Table 3, a BET specific surface area of the carbon material obtained was 494 $m^2/g$, and a benzene adsorption capacity was 25% by mass. Using the carbon material thus obtained, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 3.

Comparative Example 3

A carbon material was prepared as described in Example 1, substituting 5.0 parts by mass of pyrrole (Wako Pure Chemical Industries, Ltd., Guaranteed Reagent) for imidazole. A mass of the carbon material after filtration and drying was 105.0 parts by mass. As shown in Table 3, a BET specific surface area of the carbon material obtained was 1506 $m^2/g$, and a benzene adsorption capacity was 46% by mass. Using the carbon material thus obtained, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 3.

Comparative Example 4

A carbon material was prepared as described in Example 1, substituting 5.0 parts by mass of aniline (Wako Chemical Industries, Ltd., Guaranteed Reagent) for imidazole. A mass of the carbon material after filtration and drying was 105.0 parts by mass. As shown in Table 3, a BET specific surface area of the carbon material obtained was 1500 m$^2$/g, and benzene adsorption capacity of the carbon material was 45% by mass. Using the carbon material thus obtained, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 3.

Comparative Example 5

A carbon material was prepared as described in Example 1, substituting 5.0 parts by mass of benzimidazole (Wako Pure Chemical Industries, Ltd., Guaranteed Reagent) for imidazole. A mass of the carbon material after filtration and drying was 105.0 parts by mass. As shown in Table 3, a BET specific surface area of the carbon material obtained was 1510 m$^2$/g, and a benzene adsorption capacity of the carbon material was 44% by mass. Using the carbon material thus obtained, a polarizable electrode 6 and an electric double layer capacitor 8 were produced as described in Example 1. Then, a capacitance, a capacitance maintenance rate and a gas generation amount were measured as described in Example 1. The measurement conditions and the measurement results are shown in Table 3.

Comparative Example 6

The coconut shell powder activated carbon from Kuraray Chemical Co., Ltd. used in Example 1 was heated under a nitrogen atmosphere at 900° C. for 3 hours using a horizontal electric furnace. After heating, the amount of surface functional groups was 0.13 meq/g, a BET specific surface area was 1666 m$^2$/g, and a benzene adsorption capacity of the carbon material was 50% by mass. A polarizable electrode 6 and an electric double layer capacitor 8 were produced as described in Example 1, substituting this activated carbon for a carbon material in which imidazole was adsorbed. Then, a capacitance, a capacitance maintenance rate and a gas generation amount were measured as described in Example 1. The measurement conditions and the measurement results are shown in Table 3.

Comparative Example 7

A polarizable electrode 6 was prepared as described in Comparative Example 1. An electric double layer capacitor 8 was produced as described in Example 1, except that to the electrolytic solution, imidazole was added in 5.0 parts by mass based on the activated carbon used for preparation of this polarizable electrode 6. In the electrolytic solution prepared during the test, an imidazole concentration was 0.36% by mass. Then, as described in Example 1, a capacitance, a capacitance maintenance rate and a gas generation amount were determined. The measurement conditions and the measurement results are shown in Table 3. Furthermore, a capacitance after keeping in a thermostat bath at 60° C. while a voltage of 3.0 V was applied for 25 hours, 50 hours, 200 hours or 500 hours was also determined. The measurement results are shown in Table 2. FIG. 6 is a graph of a capacitance (F/cc) (vertical axis) vs time (h) (horizontal axis) for the values described in Table 2.

Comparative Example 8

A polarizable electrode 6 and an electric double layer capacitor 8 were prepared as described in Comparative Example 7, substituting 1,2,4-triazole (Wako Pure Chemical Industries, Ltd., Guaranteed Reagent) for imidazole. A concentration of 1,2,4-triazole in the electrolytic solution prepared during the test was 0.36% by mass. Then, as described in Example 1, a capacitance, a capacitance maintenance rate and a gas generation amount were determined. The measurement conditions and the measurement results are shown in Table 3. Furthermore, a capacitance and a capacitance maintenance rate after keeping in a thermostat bath at 60° C. while a voltage of 3.0 V was applied for 25 hours, 50 hours, 200 hours or 500 hours were also determined. The measurement results are shown in Table 2. FIG. 6 is a graph of a capacitance (F/cc) (vertical axis) vs time (h) (horizontal axis) for the values described in Table 2.

Comparative Example 9

A polarizable electrode 6 was prepared as described in Comparative Example 1. Then, an electric double layer capacitor 8 was produced as described in Example 1, except that an electrolytic solution was a 1.0 mol/L solution of tetraethylammonium tetrafluoroborate in acetonitrile "LIPASTE-AN/EAF1" from Tomiyama Pure Chemical Industries Ltd. Then, as described in Example 1, a capacitance, a capacitance maintenance rate and a gas generation amount were determined. The measurement conditions and the measurement results are shown in Table 3.

Comparative Example 10

A polarizable electrode 6 was prepared as described in Comparative Example 7. An electric double layer capacitor 8 was produced as described in Example 1, except that an electrolytic solution was a 1.0 mol/L solution of tetraethylammonium tetrafluoroborate in acetonitrile "LIPASTE-AN/EAF1" from Tomiyama Pure Chemical Industries Ltd., and to the electrolytic solution, imidazole was added in 5.0 parts by mass based on the activated carbon. An imidazole concentration in the electrolytic solution prepared during the test was 0.36% by mass. Then, as described in Example 1, a capacitance, a capacitance maintenance rate and a gas generation amount were determined. The measurement conditions and the measurement results are shown in Table 3.

Comparative Example 11

A polarizable electrode 6 and an electric double layer capacitor 8 were prepared as described in Comparative Example 10, substituting 1,2,4-triazole (Wako Pure Chemical Industries, Ltd., Guaranteed Reagent) for imidazole. An imidazole concentration in the electrolytic solution prepared during the test was 0.36% by mass. Then, as described in Example 1, a capacitance, a capacitance maintenance rate and a gas generation amount were determined. The measurement conditions and the measurement results are shown in Table 3.

Comparative Example 12

A polarizable electrode 6 and an electric double layer capacitor 8 were produced as described in Example 1, using a coconut shell powder activated carbon from Kuraray Chemical Co., Ltd. used in Example 18 as a carbon material, instead of a carbon material in which imidazole was adsorbed on an activated carbon. Then, a capacitance, a capacitance maintenance rate and a gas generation amount were measured as described in Example 1. The measurement conditions and the measurement results are shown in Table 3.

Comparative Example 13

A polarizable electrode 6 and an electric double layer capacitor 8 were produced as described in Example 1, using an alkali activated carbon used in Example 20 as a carbon material, instead of a carbon material in which imidazole was adsorbed on an activated carbon. Then, a capacitance, a capacitance maintenance rate and a gas generation amount were determined as described in Example 1, except that in determination of a capacitance, an attained voltage was 2.8 V. The measurement conditions and the measurement results are shown in Table 3.

TABLE 1

| | Activated carbon[a] | Heterocyclic aromatic compound | | | | | BET specific surface area ($m^2/g$) | Benzene adsorption amount (% by mass) |
| | | Compound name | Molecular weight | Ratio (N/C) | Content (parts by weight) | Adsorption method | | |
|---|---|---|---|---|---|---|---|---|
| Example 1 | C1 | Imidazole | 68.08 | 0.67 | 1.0 | Immersion | 1584 | 46 |
| Example 2 | C1 | Imidazole | 68.08 | 0.67 | 2.0 | Immersion | 1543 | 45 |
| Example 3 | C1 | Imidazole | 68.08 | 0.67 | 5.0 | Immersion | 1473 | 43 |
| Example 4 | C1 | Imidazole | 68.08 | 0.67 | 10.0 | Immersion | 1221 | 39 |
| Example 5 | C1 | Imidazole | 68.08 | 0.67 | 30.0 | Immersion | 791 | 27 |
| Example 6 | C1 | 1,2,4-Triazole | 69.07 | 1.5 | 5.0 | Immersion | 1484 | 44 |
| Example 7 | C1 | Pyrazole | 68.07 | 0.67 | 5.0 | Immersion | 1558 | 47 |
| Example 8 | C1 | 2-Methyl imidazole | 82.11 | 0.5 | 5.0 | Immersion | 1462 | 44 |
| Example 9 | C1 | Imidazole | 68.08 | 0.67 | 5.0 | Gas contact | 1527 | 44 |
| Example 10 | C1 | 1,2,4-Triazole | 69.07 | 1.5 | 5.0 | Gas contact | 1502 | 45 |
| Example 11 | C4 | Imidazole | 68.08 | 0.67 | 5.0 | Spraying | 1421 | 45 |
| Example 12 | C4 | Imidazole | 68.08 | 0.67 | 5.0 | Gas contact | 1504 | 43 |
| Example 13 | C4 | 1,2,4-Triazole | 69.07 | 1.5 | 5.0 | Gas contact | 1535 | 44 |
| Example 14 | C1 | Imidazole | 68.08 | 0.67 | 5.0 | Immersion | 1473 | 43 |
| Example 15 | C1 | 1,2,4-Triazole | 69.07 | 1.5 | 5.0 | Immersion | 1484 | 44 |
| Example 16 | C4 | Imidazole | 68.08 | 0.67 | 5.0 | Gas contact | 1504 | 43 |
| Example 17 | C4 | 1,2,4-Triazole | 69.07 | 1.5 | 5.0 | Gas contact | 1535 | 44 |
| Example 18 | C2 | Imidazole | 68.08 | 0.67 | 5.0 | Immersion | 2012 | 68 |
| Example 19 | C2 | Imidazole | 68.08 | 0.67 | 10.0 | Immersion | 1755 | 59 |
| Example 20 | C3 | Imidazole | 68.08 | 0.67 | 5.0 | Immersion | 1943 | 65 |
| Example 21 | C3 | Imidazole | 68.08 | 0.67 | 10.0 | Immersion | 1727 | 56 |

| | Electrolytic solution[b] | Load voltage at Endurance test (V) | Capacitance (F) | | | | Capacitance maintenance rate (%) | Gas generation amount (cc/g) |
| | | | Before the endurance test | | After the endurance test | | | |
| | | | F/g | F/cc | F/g | F/cc | | |
|---|---|---|---|---|---|---|---|---|
| Example 1 | PC | 3.0 | 27.2 | 14.6 | 24.5 | 13.1 | 90 | 29 |
| Example 2 | PC | 3.0 | 27.3 | 14.7 | 24.6 | 13.3 | 90 | 24 |
| Example 3 | PC | 3.0 | 27.3 | 14.8 | 24.4 | 13.3 | 89 | 22 |
| Example 4 | PC | 3.0 | 26.4 | 14.6 | 25.0 | 13.8 | 95 | 19 |
| Example 5 | PC | 3.0 | 25.4 | 14.7 | 22.9 | 13.3 | 90 | 16 |
| Example 6 | PC | 3.0 | 27.6 | 14.9 | 25.3 | 13.6 | 92 | 16 |
| Example 7 | PC | 3.0 | 28.2 | 15.5 | 26.1 | 14.4 | 93 | 26 |
| Example 8 | PC | 3.0 | 26.4 | 14.5 | 22.7 | 12.4 | 86 | 17 |
| Example 9 | PC | 3.0 | 27.7 | 15.2 | 25.4 | 13.9 | 92 | 24 |
| Example 10 | PC | 3.0 | 28.1 | 15.3 | 25.2 | 13.8 | 90 | 20 |
| Example 11 | PC | 3.0 | 26.9 | 14.8 | 24.3 | 13.3 | 90 | 23 |
| Example 12 | PC | 3.0 | 27.7 | 15.0 | 25.2 | 13.7 | 91 | 20 |

TABLE 1-continued

| Example | | | | | | | | |
|---|---|---|---|---|---|---|---|---|
| Example 13 | PC | 3.0 | 27.2 | 14.7 | 25.6 | 13.8 | 94 | 24 |
| Example 14 | AN | 3.0 | 27.5 | 14.9 | 24.8 | 13.5 | 90 | 15 |
| Example 15 | AN | 3.0 | 28.4 | 15.5 | 26.0 | 14.2 | 91 | 17 |
| Example 16 | AN | 3.0 | 28.4 | 15.5 | 25.7 | 14.0 | 90 | 15 |
| Example 17 | AN | 3.0 | 28.3 | 15.5 | 25.5 | 13.8 | 90 | 10 |
| Example 18 | PC | 3.0 | 32.2 | 12.9 | 28.9 | 11.6 | 90 | 16 |
| Example 19 | PC | 3.0 | 32.0 | 12.9 | 29.1 | 11.7 | 91 | 12 |
| Example 20 | PC | 2.8 | 43.3 | 20.1 | 33.6 | 15.6 | 77 | 3 |
| Example 21 | PC | 2.8 | 44.1 | 20.5 | 35.5 | 16.5 | 80 | 3 |

[a] C1: Coconut shell powder activated carbon (specific surface area 1668 m²/g), C2: Coconut shell powder activated carbon (specific surface area: 2283 m²/g), C3: Alkali activated carbon, C4: Coconut shell particulate activated carbon
[b] PC: Propylene carbonate solution, AN: Acetonitrile solution

TABLE 2

| | Activated carbon[a] | Heterocyclic aromatic compound Compound name | Content (parts by weight) | Electrolytic solution[b] | Load voltage at Endurance test (V) | Capacitance (F) Before the endurance test (F/cc) |
|---|---|---|---|---|---|---|
| Example 3 | C1 | Imidazole | 5.0 | PC | 3.0 | 14.8 |
| Example 6 | C1 | 1,2,4-Triazole | 5.0 | PC | 3.0 | 14.9 |
| Comparative Example 7 | C1 | Imidazole | 5.0 | PC | 3.0 | 15.1 |
| Comparative Example 8 | C1 | 1,2,4-Triazole | 5.0 | PC | 3.0 | 15 |

| | Capacitance (F) After the endurance test (F/cc) | | | | | Capacitance maintenance rate (%) | | | | |
|---|---|---|---|---|---|---|---|---|---|---|
| | 25 h | 50 h | 100 h | 200 h | 500 h | 25 h | 50 h | 100 h | 200 h | 500 h |
| Example 3 | 14 | 13.5 | 13.3 | 13.1 | 13 | 94 | 91 | 90 | 89 | 88 |
| Example 6 | 14.3 | 13.8 | 13.6 | 13.4 | 13.3 | 96 | 93 | 91 | 90 | 89 |
| Comparative Example 7 | 14.4 | 13.7 | 13 | 12.7 | 12.2 | 95 | 91 | 86 | 84 | 81 |
| Comparative Example 8 | 14.1 | 13.3 | 12.7 | 12.5 | 12.3 | 94 | 89 | 85 | 83 | 82 |

[a] C1: Coconut shell powder activated carbon (specific surface area: 1668 m²/g)
[b] PC: Propylene carbonate solution

TABLE 3

| | Activated carbon[a] | Heterocyclic aromatic compound Compound name | Molecular weight | Ratio (N/C) | Content (parts by weight) | Adsorption method | BET specific surface area (m²/g) | Benzene adsorption amount (% by mass) |
|---|---|---|---|---|---|---|---|---|
| Comparative Example 1 | C1 | None | — | — | — | — | 1668 | 48 |
| Comparative Example 2 | C1 | Imidazole | 68.08 | 0.67 | 50.0 | Immersion | 494 | 25 |
| Comparative Example 3 | C1 | Pyrrole | 67.09 | 0.25 | 5.0 | Immersion | 1506 | 46 |
| Comparative Example 4 | C1 | Aniline | 93.13 | 0.17 | 5.0 | Immersion | 1500 | 45 |
| Comparative Example 5 | C1 | Benzimidazole | 118.1 | 0.29 | 5.0 | Immersion | 1510 | 44 |
| Comparative Example 6 | C1[d] | None | — | — | — | — | 1666 | 50 |

TABLE 3-continued

| | | | | | | | | |
|---|---|---|---|---|---|---|---|---|
| Comparative Example 7 | C1 | Imidazole(c) | 68.08 | 0.67 | 5.0 | — | 1668 | 48 |
| Comparative Example 8 | C1 | 1,2,4-Triazole(c) | 69.07 | 1.5 | 5.0 | — | 1668 | 48 |
| Comparative Example 9 | C1 | None | — | — | — | — | 1668 | 48 |
| Comparative Example 10 | C1 | Imidazole(c) | 68.08 | 0.67 | 5.0 | — | 1668 | 48 |
| Comparative Example 11 | C1 | 1,2,4-Triazole(c) | 69.07 | 1.5 | 5.0 | — | 1668 | 48 |
| Comparative Example 12 | C2 | None | — | — | — | — | 2283 | 75 |
| Comparative Example 13 | C3 | None | — | — | — | — | 2170 | 69 |

| | Electrolytic solution[b] | Load voltage at Endurance test (V) | Capacitance (F) Before the endurance test | | Capacitance (F) After the endurance test | | Capacitance maintenance rate (%) | Gas generation amount (cc/g) |
|---|---|---|---|---|---|---|---|---|
| | | | F/g | F/cc | F/g | F/cc | | |
| Comparative Example 1 | PC | 3.0 | 28.5 | 15.0 | 25.5 | 13.5 | 90 | 36 |
| Comparative Example 2 | PC | 3.0 | 20.6 | 12.1 | 18.3 | 10.8 | 89 | 5 |
| Comparative Example 3 | PC | 3.0 | 28.2 | 15.3 | 24.7 | 13.4 | 88 | 44 |
| Comparative Example 4 | PC | 3.0 | 27.8 | 15.1 | 24.5 | 13.2 | 88 | 46 |
| Comparative Example 5 | PC | 3.0 | 28.3 | 15.6 | 23.3 | 12.9 | 82 | 25 |
| Comparative Example 6 | PC | 3.0 | 28.9 | 15.4 | 26.2 | 13.9 | 91 | 44 |
| Comparative Example 7 | PC | 3.0 | 28.3 | 15.1 | 24.4 | 13.0 | 86 | 24 |
| Comparative Example 8 | PC | 3.0 | 28.5 | 15.0 | 24.1 | 12.7 | 85 | 21 |
| Comparative Example 9 | AN | 3.0 | 28.7 | 15.3 | 25.8 | 13.8 | 90 | 27 |
| Comparative Example 10 | AN | 3.0 | 28.0 | 15.0 | 23.4 | 12.6 | 83 | 22 |
| Comparative Example 11 | AN | 3.0 | 28.4 | 15.2 | 24.3 | 13.0 | 86 | 17 |
| Comparative Example 12 | PC | 3.0 | 33.5 | 13.4 | 29.5 | 11.8 | 88 | 32 |
| Comparative Example 13 | PC | 2.8 | 45.8 | 20.2 | 31.9 | 14.0 | 70 | 7 |

[a]C1: Coconut shell powder activated carbon (specific surface area: 1668 m²/g), C2: Coconut shell powder activated carbon (specific surface area: 2283 m²/g), C3: Alkali activated carbon, C4: Coconut shell particulate activated carbon
[b]PC: Propylene carbonate solution, AN: Acetonitrile solution
(c)Added to an electrolytic solution
[d]Heating at 900° C.

As seen from Tables 1 and 3, an electric double layer capacitor containing polarizable electrodes produced using a carbon material for polarizable electrodes of the present invention exhibits excellent durability without reducing a capacitance per a unit electrode volume. Furthermore, it can be also seen that gas generation is inhibited. Furthermore, as seen from Table 2 and FIG. 6, an electric double layer capacitor of the present invention can keep excellent durability for a longer time in comparison with an electric double layer capacitor in which a heterocyclic aromatic compound is directly added to an electrolytic solution. In terms of providing an electric double layer capacitor which is highly durable, preliminarily adsorbing a heterocyclic aromatic compound to an activated carbon rather than adding the heterocyclic aromatic compound to an electrolytic solution is very significant.

EXPLANATION OF REFERENCES

1: Electrode composition
2: Electrically-conducting adhesive
3: Etching aluminum foil
4: Tab
5: Sealant
6: Polarizable electrode
7: Wrapping sheet
8: Electric double layer capacitor

The invention claimed is:

1. A carbon material in which a heterocyclic aromatic compound is adsorbed on an activated carbon, wherein
the heterocyclic aromatic compound comprises a five- or six-membered ring having two or more nitrogen atoms as ring-forming atoms;
a ratio (N/C) of nitrogen atoms to carbon atoms in the heterocyclic aromatic compound is 0.4 or more;
1 to 35 parts by mass of the heterocyclic aromatic compound is adsorbed based on 100 parts by mass of the activated carbon; and
the carbon material has a benzene adsorption capacity of 25 to 75% by mass.

2. The carbon material according to claim 1, wherein the heterocyclic aromatic compound comprises at least one selected from the group consisting of an imidazole ring, a pyrazole ring, a 1,2,3-triazole ring and a 1,2,4-triazole ring.

3. The carbon material according to claim 1, wherein the heterocyclic aromatic compound has a molecular weight of 100 or less.

4. A method for producing the carbon material according to claim 1, comprising adsorbing the heterocyclic aromatic compound to the activated carbon.

5. The method for producing a carbon material according to claim 4, comprising immersing the activated carbon in a liquid containing the heterocyclic aromatic compound and drying the activated carbon to adsorb the compound to the activated carbon.

6. The method for producing a carbon material according to claim 4, comprising spreading a liquid containing the heterocyclic aromatic compound to adsorb the compound to the activated carbon.

7. The method for producing a carbon material according to claim 4, comprising contacting the activated carbon with a vapor of the heterocyclic aromatic compound to adsorb the compound to the activated carbon.

8. A polarizable electrode formed by applying an electrode composition comprising the carbon material according to claim 1, a binder and a conductive material on a current collector.

9. An electric double layer capacitor, wherein polarizable electrodes according to claim 8 are disposed to face each other via a separator, and the electrode composition comprises a nonaqueous electrolytic solution.

* * * * *